July 31, 1928.

R. B. LINCOLN

TEMPERATURE CONTROL SYSTEM

Filed March 21, 1927

1,678,865

WITNESSES:
R. S. Williams
G. B. Fjoflot

INVENTOR
Rollo B. Lincoln

BY
Wesley G. Carr
ATTORNEY

Patented July 31, 1928.

1,678,865

UNITED STATES PATENT OFFICE.

ROLLO B. LINCOLN, OF WILKINSBURG, PENNSYLVANIA, ASSIGNOR TO WESTINGHOUSE ELECTRIC & MANUFACTURING COMPANY, A CORPORATION OF PENNSYLVANIA.

TEMPERATURE-CONTROL SYSTEM.

Application filed March 21, 1927. Serial No. 176,886.

My invention relates to control systems and particularly to temperature-control systems.

An object of my invention is to provide a control system that shall be operable to maintain the thermal condition of a medium or a body substantially constant.

Another object of my invention is to provide a control system, operable to maintain an average condition of temperature in a heated body or medium, that shall embody means for preventing over and under-shooting of the said condition.

A further object of my invention is to provide a system for controlling the temperature of a heated device that shall have a thermal responsive element acting alone to control the temperature of a device when the temperature thereof is normal and that shall embody thermal-responsive means for aiding said thermal-responsive element to return the temperature of the device to normal only when the temperature thereof departs from normal; and A further object of my invention is to provide a temperature-control system that shall comprise a main thermo-couple, a plurality of auxiliary thermo-couples and heating means therefor for modifying the effectiveness of the main thermo-couple when the thermal condition of the main thermo-couple departs from normal.

In practicing my invention, I provide a system for controlling the thermal condition of a medium or heated body that is particularly adapted to so control the source of energy directly affecting the thermal condition of the medium or heated body that overshooting and under-shooting of the thermal condition to be maintained is reduced to a negligible value. The expression "overshooting and under-shooting" is, in general, known as hunting.

My improved system has useful application to the control of such electrically heated bodies as solder and lead pots and furnaces.

Figure 1:
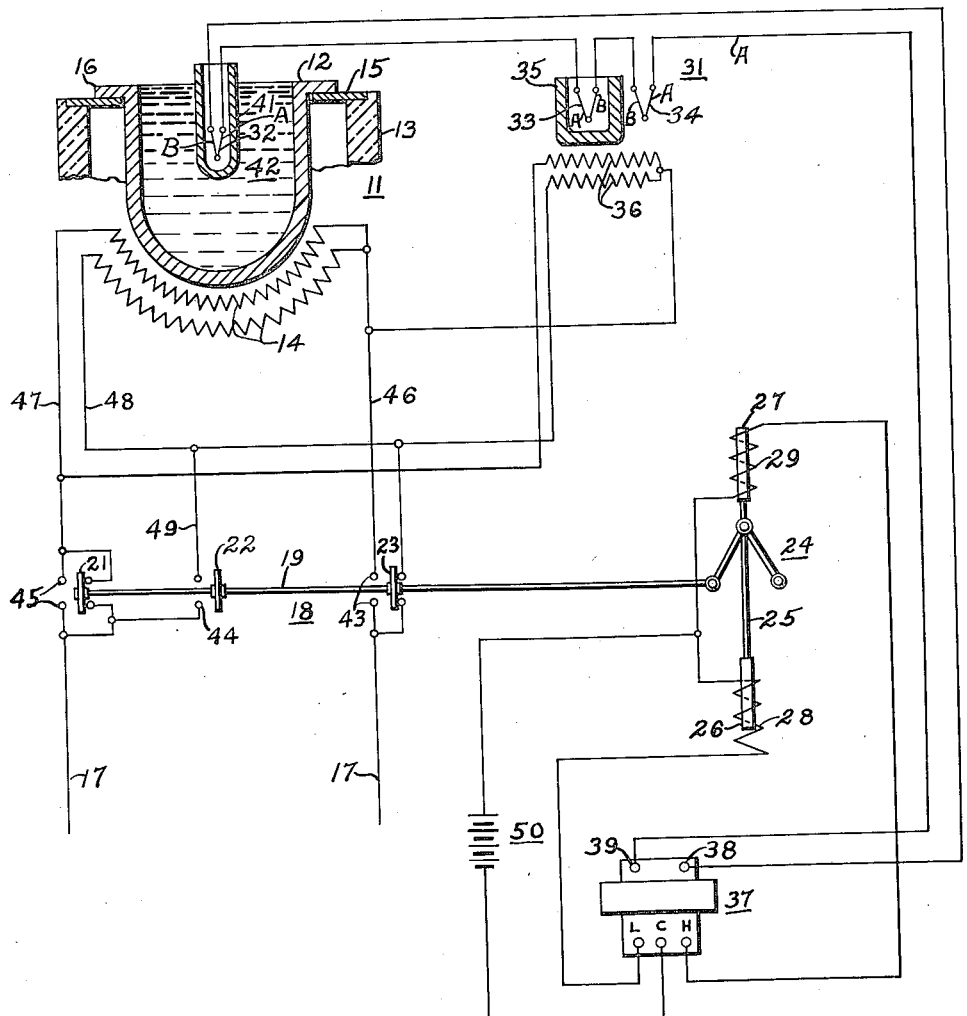
Figure 2:
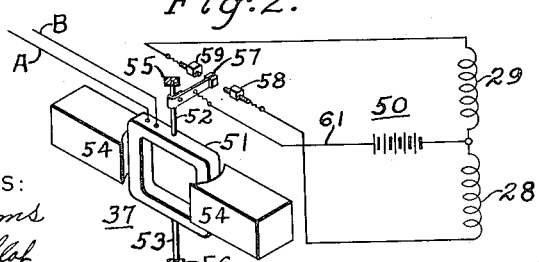

Fig. 1 is a partially sectional and partially diagrammatic view of an electrically heated device and a temperature-control system, embodying my invention, for controlling the temperature of the heated device; and Fig. 2 is a schematic illustration of circuit-controlling means embodying my invention.

In Fig. 1 of the drawings, an electrically heated device 11 comprises, in general, a container 12, a wall 13 of insulating material and a plurality of resistor heating elements 14. The container 12 is supported within the wall 13 by means of an annular ring 15 carried thereby and an annular flange 16 forming a part of the container 12. The resistor elements 14 are energized from a pair of electric supply conductors 17. The resistor elements 14 may be connected in series or in parallel by means of a switch mechanism 18.

The switch mechanism 18 is illustrated schematically and may comprise a rod 19 moving in suitable bearing supports (not shown) and having a plurality of contact-bridging members 21, 22 and 23 secured thereto and insulated from each other. The rod 19 is provided with a toggle mechanism 24, whereby it may be actuated longitudinally. The toggle mechanism 24 is connected to a rod 25, the ends of which are provided with core members 26 and 27 that are movable from one position to another by means of a pair of solenoids 28 and 29.

The energization of the resistor elements 14 is controlled by means of my improved temperature-control system 31 that comprises a main thermo-couple 32, auxiliary thermo-couples 33 and 34, an auxiliary body 35, heated by means of a plurality of auxiliary resistor elements 36 and a control instrument 37 that is actuable to a plurality of positions, by means of the thermo-couples, for controlling the operation of the toggle mechanism 24.

The thermo-couples illustrated in my control system 31 consist of two alloys of different materials that my, for purposes of illustration, be designated alloys A and B. As illustrated in the drawings, the alloy B of thermo-couple 32 is connected directly to a terminal 38 of the control instrument 37, and the alloy A thereof is connected to alloy A of the thermo-couple 33. The alloy B of thermo-couple 33 is connected to alloy B of thermo-couple 34 and alloy A of thermo-couple 34 is connected to a terminal 39 of the control instrument 37. It is evident, therefore, that the thermo-couple 33 is so connected to the thermo-couples 32 and 34 that its electromotive force will oppose the electromotive forces of the thermo-couples 32 and 34, the electromotive forces thereof being additive relatively to each other.

The thermo-couple 33 is disposed within the body 35 and the thermo-couple 34 is located in close proximity to the resistor elements 36 in order to be responsive to the temperature of the resistor elements. The thermo-couple 32 is suspended within a shielding tube 41 that is partially submerged in material 42 to be heated in the container 12.

When the switching mechanism 18 is in the position illustrated in the drawings, the resistor elements 14 are connected in series to the supply conductors 17. The resistor elements 36 being connected similarly to the mechanism 18 are also in series. When the switch mechanism 18 is actuated to another position such that the contact bridging members 21 to 23, inclusive, engage the relatively stationary contact members 43, 44 and 45, respectively, the resistor elements 14 and 36 are connected in parallel-circuit relation to the supply conductors 17.

When the resistor elements 14 and 36 are connected in parallel-circuit relation, the energizing circuit therefor comprises one of the supply conductors 17, contact bridging member 23, conductor 46, resistor elements 14, conductors 47 and 48, contact bridging member 21, conductor 49 and bridging member 22 to the other of the supply circuit conductors 17. One end of each of the resistor elements 36 is connected to the supply conductor 46, the other ends thereof being connected to conductors 47 and 48, respectively. It is, therefore, evident that, when the circuit connections of the resistor elements 14 are changed from series to parallel or vice versa, the circuit connections of the resistor elements 36 are changed correspondingly.

If it be assumed that the resistor elements 14 and 36 have been connected in parallel for a sufficient length of time to heat the material in the container 12 and the auxiliary thermo-couples to such a temperature that the electromotive forces of the thermo-couples 32 and 34 are sufficient to actuate the control instrument 37 to such a position that the electromagnet coil 29 is energized from a suitable source of electromotive force 50, thus causing the toggle mechanism 24 to operate, whereby the contact bridging members 21 to 23, inclusive, are actuated to substantially the positions illustrated in the drawings. The resistor elements are, therefore, connected in series, and the power input to the heated bodies 12 and 35 is reduced.

Since the temperature of the resistor elements 14 and the wall 13 is relatively high as compared with that of the material 42, the temperature of the material tends to increase. But, as the thermo-couple 33 has not been appreciably affected by the temperature of the resistor elements 36 and, since the energization thereof has been reduced, the temperature of the thermo-couple 34 is lowered in proportion to the reduction in temperature of the auxiliary elements 36. The effect of the electromotive forces of thermo-couples 32 and 34 on the control instrument 37, is, therefore, such that the instrument indicates a temperature substantially equal to, or possibly a trifle lower than, that which exists in the material 42 and causes the magnet coil 28 to be energized and to actuate the contact bridging members 21, 22, and 23 into engagement with the stationary contacts 43 to 45, whereby the resistor elements 14 and 36 are connected in parallel.

Thus, the temperature of the material 42 tends to increase in response to the increased energization of the resistor elements 14. Likewise, the temperature within the body 35 tends to increase. After the resistor elements 36 have been energized alternately in series and in parallel relation for a certain length of time, the temperature within the body 35 finally attains a value that is substantially equal to the temperature of the thermo-couple 34. When this condition exists, the electromotive forces of the thermo-couples 33 and 34 balance each other, the result being that the thermo-couple 32 alone effects the operation of the control instrument 37. When the thermo-couple 32 is acting alone to actuate the control instrument, the temperature of the material 42 is substantially equal to the desired temperature to be maintained therein.

If the temperature of the thermo-couple 32 increases to a value slightly beyond the normal temperature, the control instrument 37 is actuated to a position indicative of a temperature higher than normal and causes the coil 29 to be energized and the switch mechanism 24 to be actuated to that position which causes the resistor elements 14 and 36 to be connected in series. Thus, the energization of the resistor elements is reduced and, after the lapse of a certain interval of time, the temperatures of the thermo-couples 32 and 34 will have been lowered also.

Since the temperatures of the body 35 and the thermo-couple 33 have not decreased appreciably and since the electromotive force of the thermo-couple 33 opposes the combined electromotive forces of the thermo-couples 32 and 34, the effect is such that the control instrument 37 is actuated to that position which operates to connect the resistor elements 14 and 36 in parallel-circuit relation to the supply conductors 17.

The control system illustrated operates substantially as has been mentioned herein, so that the energization of the resistor elements 14, which effects the heating of the material 42, is controlled by a series of increasing and decreasing increments until the temperature therein is substantially normal. During the heating-up period of the material 42, the thermo-couple 34 aids the thermo-couple 32 to actuate the control instrument 37. But, when the temperature of the material 42 has become substantially normal, the electromotive force of the thermo-couple 33 balances that of the thermo-couple 34, whereby the thermo-couple 32 operates alone to control the temperature of the body 42.

In Fig. 2 of the drawing, the control instrument 37, illustrated schematically, is shown as being provided with a coil 51 having shafts 52 and 53. The coil 51 is positioned between the poles of a suitable permanent magnet 54, and the terminals thereof are connected to alloys B and A of the thermo-couples 32 and 34, respectively. The shafts 52 and 53 are journaled in suitable bearings, 55 and 56.

An arm 57, having contact members at the ends thereof for engaging a pair of stationary contact members 58 and 59, is secured to the shaft 52. The movable arm 57, is connected to one terminal of the source of supply 50 by means of a conductor 61. The stationary contact member 59 is connected to one terminal of the electromagnet coil 29, and the stationary contact member 58 is connected to one terminal of the electromagnet coil 28. The other terminals of the electromagnet coils 28 and 29 are connected to one terminal of the source of supply 50.

By my invention, I have provided a system of temperature control for heated bodies whereby a temperature may be established within a body or medium that will be substantially uniform and constant.

Various modifications may be made in the device embodying my invention without departing from the spirit and scope thereof. I desire, therefore, that only such limitations shall be placed thereon as are imposed by the prior art and the appended claims.

I claim as my invention:

1. The combination with a main body, heating means therefor, an auxiliary body and auxiliary heating means therefor, of temperature-responsive means for controlling the energization of said heating means, said temperature-responsive means comprising a main thermo-couple responsive to the temperature of the main body, a thermo-couple responsive to the temperature of the auxiliary heating means and a thermo-couple subjected to the temperature of said auxiliary body, said thermo-couples being so connected that the last named couple opposes the electromotive force of the first named couples.

2. The combination with a body to be heated and heating means therefor, of means for controlling the energization of said heating means in accordance with a thermal condition of a predetermined value to be maintained in said body, said means comprising a thermo-couple subjected to the temperature of the body, auxiliary heating means, a second thermo-couple subjected to the temperature of the auxiliary heating means, said thermo-couples being so connected that the electromotive force generated by the one is additive to the electromotive force generated by the other, and means for rendering the second thermo-couple ineffective when the said predetermined thermal condition obtains in said body.

3. A temperature-control system comprising a thermo-couple responsive to the temperature of a body to be heated, an auxiliary body heating means therefor, a thermo-couple responsive to the temperature of said heating means, and a thermo-couple responsive to the temperature of the auxiliary body and connected to said first named thermo-couples but in opposition thereto.

4. A temperature-control system comprising temperature-responsive means subjected to the temperature of a heated body, an auxiliary body, heating means therefor, temperature-responsive means subjected to the temperature of said auxiliary body heating means for aiding said first named temperature-responsive means, and means actuable by said thermo-responsive means for controlling the heating of said bodies.

5. A temperature-control system comprising temperature-responsive means subjected to the temperature of a heated body, an auxiliarly body, heating means therefor, temperature-responsive means subjected to the temperature of said heating means for aiding said first named temperature-responsive means, thermo-responsive means subjected to the temperature of the auxiliarly body for opposing said two first named temperature-responsive means, and means actuable by the combined effect of said temperature-responsive means for controlling the heating of said bodies.

6. The combination with a body, means for heating said body, an instrument for regulating the energization of said means, and a thermo-couple subjected to the temperature of said body for actuating the control instrument, of means for aiding said thermo-couple to actuate the control instrument to thereby decrease the energization of the heating means when the body attains a temperature slightly less than the temperature to be maintained therein and for causing said thermo-couple to be effective to actuate said control instrument without the aid of said means when the temperature of said body becomes substantially constant.

7. The combination with a body, heating means therefor, and a control instrument for regulating the energization of said heating means, of means for actuating said control instrument, said means comprising a thermo-couple subjected to the temperature of said body, auxiliary heating means energized in accordance with said first heating means, a second thermo-couple subjected to the temperature of said auxiliary heating means, and a third thermo-couple disposed in close proximity to the auxiliary heating means, means for insulating the third thermo-couple from the auxiliary heating means, said third thermo-couple being connected in opposed relation to the first two thermo-couples.

8. The combination with a body, resistor elements for heating said body, a thermo-couple subjected to the temperature of said body, and means actuable by the thermo-couple for controlling the energization of said resistor elements to thereby maintain a substantially constant temperature of predetermined value in said body, of means for preventing overshooting and undershooting of said predetermined temperature comprising an auxiliary body, a resistor element therefor having its energization controlled in accordance with the energization of said resistor elements, a second thermo-couple subjected to the temperature of said resistor element for aiding the effectiveness of the first named thermo-couple, and a third thermo-couple, responsive to the temperature of said auxiliary body, connected to the first and second thermo-couples but in opposition thereto.

9. In a temperature-control system for a body to be heated provided with heating means, in combination, temperature-responsive means for controlling the energization of the heating means comprising a thermo-couple responsive to the temperature of said body, an auxiliary body, means for heating said auxiliary body, a thermo-couple responsive to the temperature of a region adjacent to said auxiliary-body-heating means, a thermo-couple responsive to the temperature of the auxiliary body, and means for so connecting the thermo-couples that the last-named thermo-couple opposes the electromotive force of the first named thermo-couples.

In testimony whereof, I have hereunto subscribed my name this 15th day of March, 1927.

ROLLO B. LINCOLN.